US 11,642,860 B2

(12) United States Patent
Ogale (10) Patent No.: US 11,642,860 B2
(45) Date of Patent: May 9, 2023

(54) METHOD OF MAKING THERMOPLASTIC COMPOSITE STRUCTURES AND PREPREG TAPE USED THEREIN

(71) Applicant: The Boeing Company, Chicago, IL (US)

(72) Inventor: Amol Ogale, Munich (DE)

(73) Assignee: The Boeing Company, Arlington, VA (US)

( * ) Notice: Subject to any disclaimer, the term of this patent is extended or adjusted under 35 U.S.C. 154(b) by 111 days.

(21) Appl. No.: 15/431,352

(22) Filed: Feb. 13, 2017

(65) Prior Publication Data

US 2018/0229452 A1 Aug. 16, 2018

(51) Int. Cl.
*B29C 70/46* (2006.01)
*B29C 70/38* (2006.01)
(Continued)

(52) U.S. Cl.
CPC ............ *B29C 70/465* (2013.01); *B29C 65/02* (2013.01); *B29C 65/486* (2013.01); *B29C 65/4815* (2013.01); *B29C 65/522* (2013.01); *B29C 66/1122* (2013.01); *B29C 66/45* (2013.01); *B29C 66/721* (2013.01); *B29C 66/73115* (2013.01); *B29C 66/73921* (2013.01); *B29C 66/8362* (2013.01); *B29C 70/386* (2013.01); *B32B 7/12* (2013.01); *B32B 27/08* (2013.01); *B32B 27/285* (2013.01); *B32B 27/286* (2013.01); *B32B 27/32* (2013.01); *B32B 37/1207* (2013.01); *B32B 37/16* (2013.01); *B29C 65/1412* (2013.01); *B29C 65/1454* (2013.01); *B29C 65/16* (2013.01); *B29C 66/71* (2013.01); *B29C 66/72141* (2013.01); *B29K 2023/06* (2013.01); *B29K 2023/12* (2013.01); *B29K 2071/00* (2013.01); *B29K 2079/085* (2013.01); *B29K 2081/06* (2013.01);
(Continued)

(58) Field of Classification Search
CPC .. B29C 70/386; B29C 70/465; B29C 65/4815
See application file for complete search history.

(56) References Cited

U.S. PATENT DOCUMENTS 3,458,382 A   7/1969  Buck
3,578,543 A   5/1971  Cook et al.
(Continued)

FOREIGN PATENT DOCUMENTS

DE   102005025083 B4   5/2007
EP       0320155 A2    6/1989
(Continued)

OTHER PUBLICATIONS

Extended European Search Report, dated Jun. 18, 2018, regarding Application No. 17206535.1, 9 pages.
(Continued)

*Primary Examiner* — Matthew J Daniels
(74) *Attorney, Agent, or Firm* — Yee & Associates, P.C.

(57) ABSTRACT

A thermoplastic composite structure is produced by consolidating and forming a composite preform to a desired shape. The preform comprises plies of a high melt temperature thermoplastic prepreg that are tacked together by a low melt temperature thermoplastic adhering the plies together in fixed registration.

23 Claims, 7 Drawing Sheets

(51) Int. Cl.

| | | |
|---|---|---|
| *B32B 37/12* | (2006.01) | |
| *B29C 65/00* | (2006.01) | |
| *B29C 65/02* | (2006.01) | |
| *B29C 65/48* | (2006.01) | |
| *B29C 65/52* | (2006.01) | |
| *B32B 7/12* | (2006.01) | |
| *B32B 27/08* | (2006.01) | |
| *B32B 27/28* | (2006.01) | |
| *B32B 27/32* | (2006.01) | |
| *B32B 37/16* | (2006.01) | |
| *B29K 105/08* | (2006.01) | |
| *B29C 65/14* | (2006.01) | |
| *B29K 101/12* | (2006.01) | |
| *B29C 65/16* | (2006.01) | |
| *B29K 23/00* | (2006.01) | |
| *B29K 71/00* | (2006.01) | |
| *B29K 79/00* | (2006.01) | |
| *B29K 81/00* | (2006.01) | |

(52) U.S. Cl.
CPC .. *B29K 2101/12* (2013.01); *B29K 2105/0872* (2013.01); *B32B 2037/1215* (2013.01); *B32B 2037/1238* (2013.01); *B32B 2305/076* (2013.01); *B32B 2398/20* (2013.01)

(56) References Cited

U.S. PATENT DOCUMENTS

| | | | |
|---|---|---|---|
| 4,295,591 A | 10/1981 | Lundstrom | |
| 4,443,507 A | 4/1984 | Yamada et al. | |
| 5,039,371 A | 8/1991 | Cremens et al. | |
| 5,066,536 A * | 11/1991 | Cogswell | B29C 66/721 |
| | | | 428/216 |
| 5,080,851 A * | 1/1992 | Flonc | B29B 11/16 |
| | | | 156/222 |
| 5,176,949 A * | 1/1993 | Allagnat | B29C 70/345 |
| | | | 156/290 |
| 5,476,627 A * | 12/1995 | Black | B29B 15/122 |
| | | | 156/291 |
| 8,333,858 B2 | 12/2012 | Rubin et al. | |
| 9,102,103 B2 | 8/2015 | Fox et al. | |
| 9,238,338 B2 | 1/2016 | Wilkerson et al. | |
| 2003/0175520 A1 | 9/2003 | Grutta et al. | |
| 2006/0048881 A1* | 3/2006 | Evans | B29C 66/8362 |
| | | | 156/64 |
| 2014/0120332 A1 | 5/2014 | Jalowka et al. | |
| 2014/0131917 A1* | 5/2014 | Naumann | B32B 37/0007 |
| | | | 425/500 |
| 2014/0374018 A1* | 12/2014 | Creaser | B32B 37/1018 |
| | | | 428/206 |

FOREIGN PATENT DOCUMENTS

| | | | | |
|---|---|---|---|---|
| EP | 2733161 A1 | 5/2014 | | |
| EP | 2894025 A1 | 7/2015 | | |
| GB | 2485453 B | 7/2016 | | |
| JP | H10291082 A | 11/1998 | | |
| JP | 2012-508662 | 11/2009 | | |
| RU | 2431566 C2 | 10/2011 | | |
| WO | WO9004507 A1 | 5/1990 | | |
| WO | 2010055404 A1 | 5/2010 | | |
| WO | 2013008720 A1 | 1/2013 | | |
| WO | WO2013128138 A2 * | 9/2013 | ............. | B29C 70/22 |

OTHER PUBLICATIONS

Campbell, "Manufacturing Processes for Advanced Composites, Chapter 10: Thermoplastic Composites, an Unfulfilled Promise," Elsevier Advanced Technology, Oxford, GB, Jan. 2004, 43 pages.

Kollmannsberger et al.," Challenges for Thermoplastic-Automated Fiber Placement (TP-AFP) with in SITU Consolidation on 3D Parts", 17th European Conference on Composite Materials (ECCM17), Munich, Germany, Jun. 26-30, 2016, 8 pages.

Quadrini et al., "Diode Laser Assisted Filament Winding of Thermoplastic Matrix Composites", MDPI Journals, Materials 2010, vol. 3, Iss. 1, pp. 563-571.

Federal Institute of Industrial Property Office Action and English Translation, dated Apr. 16, 2021, regarding Application No. 2017140876/05, 12 pages.

GCC Patent Office Examination Report and English translation, dated Oct. 28, 2019, regarding Application No. GC2018-34747, 5 pages.

Korean Office Action dated Oct. 5, 2021 regarding KR Application No. 10-2018-0016308; 14 pages.

Notice for Reasons of Rejection and English translation, dated Aug. 23, 2021, regarding Japan Application No. 2017-227708.

Decision of Rejection dated Jan. 17, 2022, regarding Japanese Application No. 2017-227708; 5 pages.

Federal Institute of Industrial Property Notification and English Translation, dated Dec. 8, 2020, regarding Application No. 2017140876, 15 pages.

China National Intellectual Property Administration First Notification of Office Action and English Translation, dated Jan. 19, 2021, regarding Application No. 201810018217.3, 22 pages.

National Intellectual Property Administration, PRC Examination Report and English Translation, dated Feb. 4, 2021, regarding Application No. GCC/CN2020/000064, 7 pages.

\* cited by examiner

METHOD OF MAKING THERMOPLASTIC COMPOSITE STRUCTURES AND PREPREG TAPE USED THEREIN

BACKGROUND INFORMATION

1. Field

The present disclosure generally relates to composite structures, and deals more particularly with a method of making a composite laminate structure using a high temperature thermoplastic prepreg preform.

2. Background

Composite laminate structures employing high temperature thermoplastic polymers are typically consolidated at temperatures above 300° C., and in some cases at 400° C. or higher. In one application, a multi-ply prepreg preform is laid up and then formed to a desired shape using stamp forming or other techniques. The preform is heated to a consolidation temperature either before or during the forming process. The plies are laid up using for example, automatic tape laying (ATL) machines which laydown and compact strips of thermoplastic prepreg.

The plies of the preform often have different tape formations such as ply doublers and ply drop-offs that create structural features when stacked. Consequently, it is important to maintain registration of the plies relative to each other as they are being laid up, and subsequently while they are being stored, transported, consolidated and and/or formed to shape. One technique for maintaining the necessary ply registration involves tacking the plies together by melting the prepreg tape as it is being laid down and compacted by the tape laying equipment. In the case of a high temperature thermoplastic prepreg, a high-energy device such as a laser is used to heat the thermoplastic to its melt temperature which, as noted above, is typically between 300° C. and 400° C. or higher. This tacking method has several disadvantages. Heating the high temperature thermoplastic to its melt temperature may result in uneven recrystallization of the polymer during cool down, causing undesired variations in material characteristics of the composite structure. Also, the speed with which tape can be laid down is limited by the time required to heat the high temperature thermoplastic to its melt temperature. Further, melting the plies in order to tack them together reduces their ability to shear (slip relative to each other) when being formed to shape, which may lead to ply wrinkling or buckling.

SUMMARY

The disclosure relates in general to composite structures, and more specifically to composite laminates employing high temperature thermoplastic polymers.

According to one aspect, a method is provided for making a thermoplastic composite preform. The method includes assembling a stack of high melt temperature thermoplastic composite plies, and introducing a low melt temperature thermoplastic between composite plies. The method also includes tacking the high melt temperature thermoplastic composite plies together by melting the low melt temperature thermoplastic.

According to another aspect, a method is provided of making a thermoplastic composite structure. The method comprises producing a composite preform having fiber reinforced thermoplastic plies wherein the plies include both a high melt temperature thermoplastic and a low melt temperature thermoplastic. The method also includes tacking the plies together by melting the low melt temperature thermoplastic, and consolidating the composite preform.

According to a further aspect, a method is provided for making a strip of composite material for use in fabricating a composite structure. The method comprises providing a strip of high melt temperature thermoplastic prepreg, and applying a low melt temperature thermoplastic on the surface of the strip of the high melt temperature thermoplastic prepreg.

According to still another aspect, a thermoplastic composite tape is provided comprising a strip of high melt temperature thermoplastic prepreg, and a low melt temperature thermoplastic adhered to a surface of the strip of high melt temperature thermoplastic prepreg. The low melt temperature thermoplastic has a melt temperature that is below the melt temperature of the strip of high melt temperature thermoplastic prepreg.

According to still another embodiment, a thermoplastic composite preform comprises a stack of plies of thermoplastic prepreg having a melt temperature at which the plies can be consolidated, and a thermoplastic polymer tacking the plies together. The thermoplastic polymer has a melt temperature below melt temperature of the thermoplastic prepreg.

One of the advantages of the disclosed embodiments is that plies of a high temperature thermoplastic laminate can be tacked together and held in registration without the need for melting the high temperature polymer. Thus, composite laminate structures can be produced with more uniform material characteristics. Another advantage is that tape laydown speed may be increased, and lower power thermal energy sources can be used to achieve ply tacking. Still another advantage is that the plies have a greater ability to shear as they are being formed to final shape, thus reducing the possibility of ply wrinkling or buckling.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Figures 1, 2:
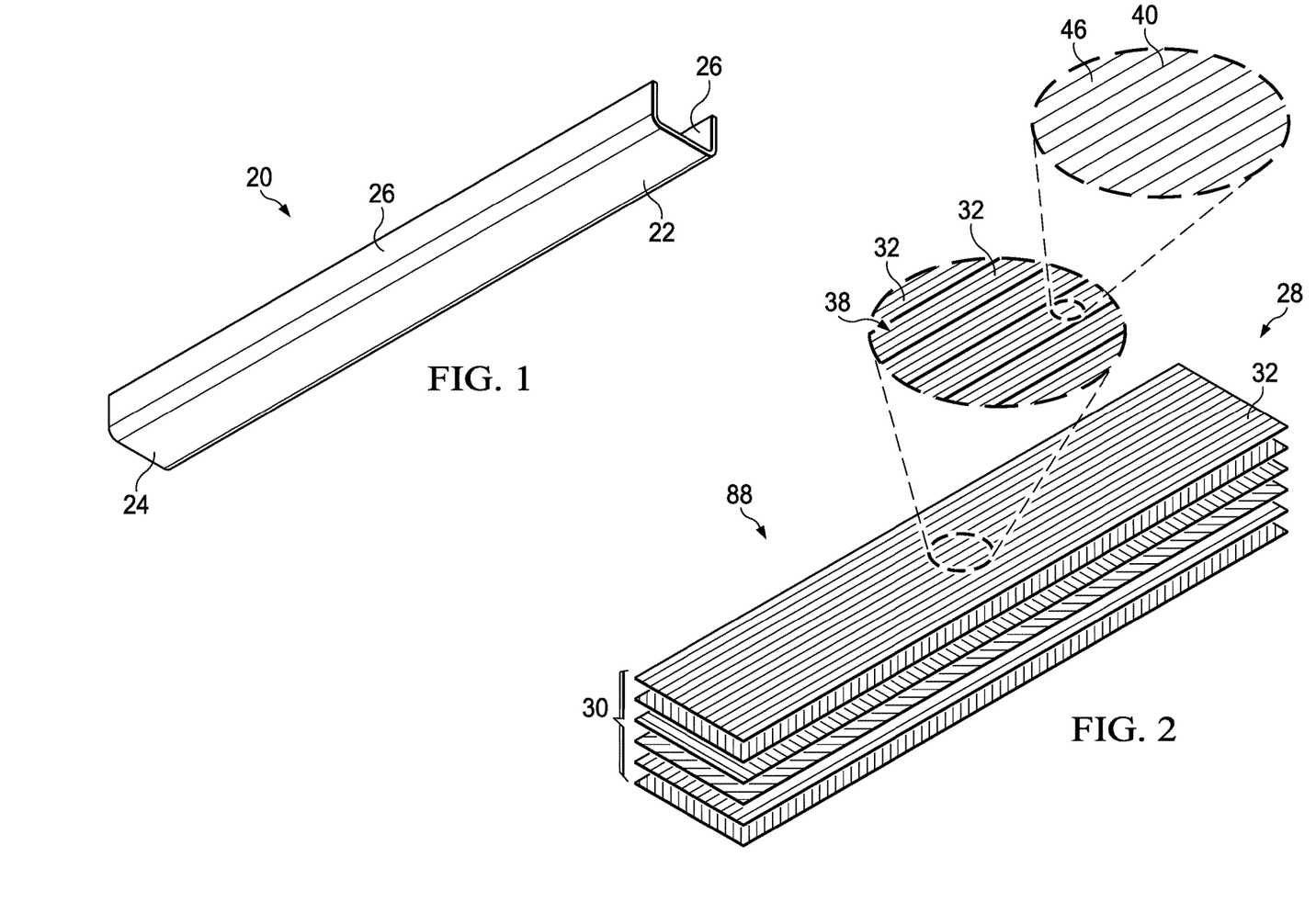
FIG. 1 is an illustration of a perspective view of a high temperature thermoplastic composite laminate structure.
FIG. 2 is an illustration of perspective view of a ply stack used to produce the structure shown in FIG. 1, slightly exploded to better show the individual plies.

Referring first to FIG. 1, the disclosed embodiments relate to a method of making a composite laminate structure 20. In this example, the composite laminate structure 20 is a channel stiffener 22 having a base 24 and a pair of legs 26 forming a U-shaped cross section. Although the illustrated channel stiffener 22 is straight, in other examples it may have one or more contours, twists, curvatures and/or joggles, or other features, and may have any of a variety of cross section shapes, including but not limited to "I", "J", "Z", "T", "C" shapes. The channel stiffener 22 is merely illustrative of a wide range of parts and structures that may be produced using principles of the disclosed embodiments.

Referring now to FIG. 2, the composite laminate structure 20 may be produced by assembling a stack 28 of composite plies 30 which are tacked together to form a flat composite preform 88, sometimes referred to as a blank. In the illustrated example, each of the composite plies 30 comprises strips 32 of prepreg tape 38 laid down side-by-side, in which a fiber reinforcement 40 is held in a high melt temperature thermoplastic resin 46. In other examples, however, the composite plies 30 may be laid up using any of a variety of other techniques, including automatic fiber placement (AFP), hand layup, braiding and weaving, and may comprise sheets (not shown) of prepreg, rather than strips of high melt temperature thermoplastic composite prepreg 32. The composite plies 30 may have varying fiber orientations, depending upon the performance requirements for the channel stiffener 22. Although not shown in the drawings, the stack 28 may include one or more ply drop-offs, doublers and/or other features, depending upon the particular ply schedule required for the application.

Figure 3:
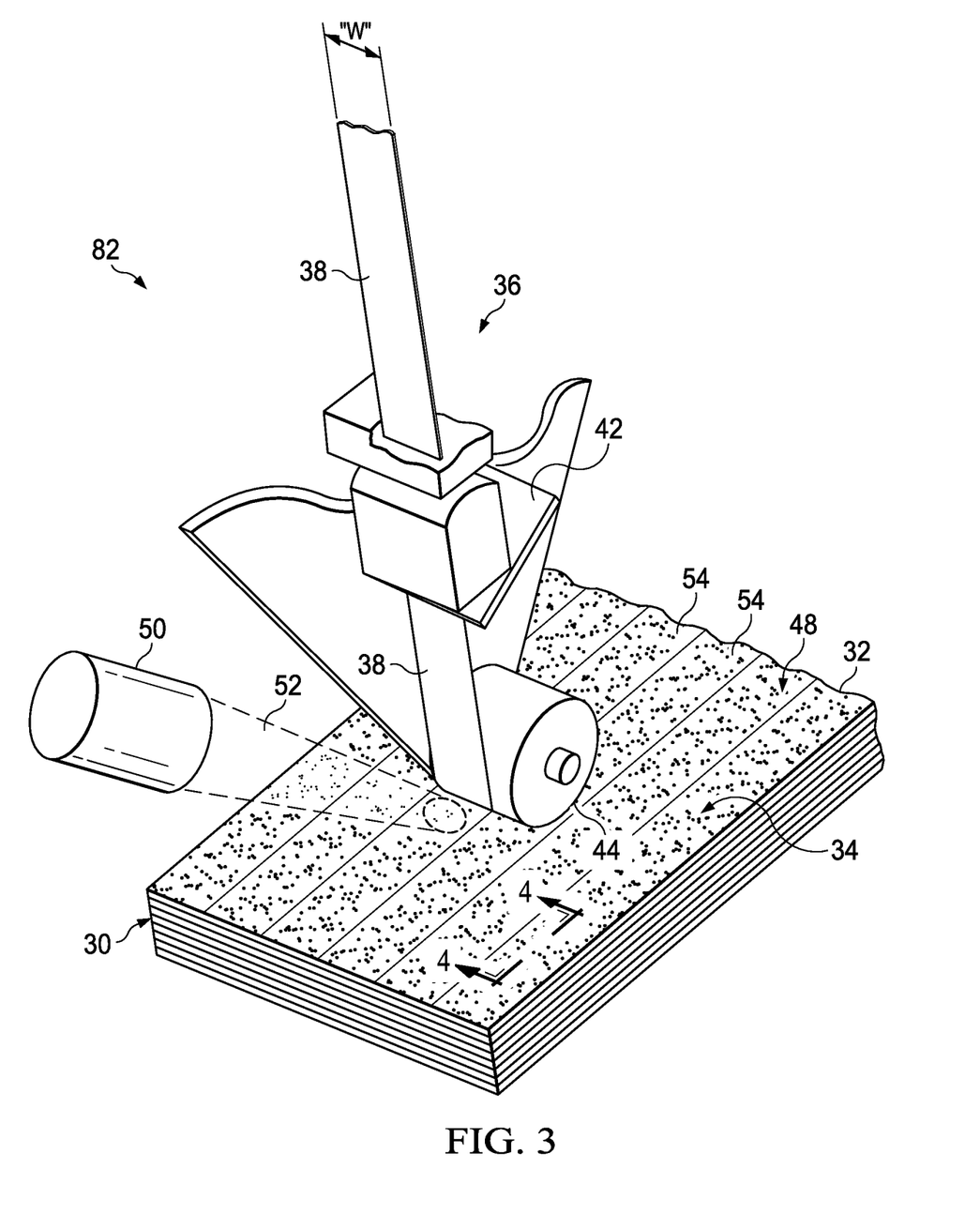
FIG. 3 is an illustration of a perspective view of automatic tape laying equipment laying up a ply, wherein a thermal energy source is melting low temperature thermoplastic particles on the surface of the ply.

Referring to FIG. 3, in the illustrated example, each of the composite plies 30 is laid up using automatic tape laying (ATL) equipment 82. The ATL equipment 82 may include an end effector in the form of a tape placement head 36 for laying down composite prepreg tape 38 on a substrate 48 which may be either a tool (not shown) or an underlying one of the composite plies 30. The composite prepreg tape 38 comprises a fiber reinforcement 40 in the form of unidirectional reinforcing fibers held in a high melt temperature thermoplastic resin 46. In the illustrated example, the composite prepreg tape 38 has particles of a low melt temperature thermoplastic 54 on the surface 34 thereof, however as will be discussed below, the low melt temperature thermoplastic 54 may be in other forms on the surface 34 of the tape 38.

As used herein, "high melt temperature thermoplastic" 46 is a thermoplastic that typically melts and permits laminate consolidation at temperatures above approximately 300° C. Examples of a high melt temperature thermoplastic 46 include, but are not limited to PSU (polysulfone), PEI (polyethylenimine), PEKK (polyetherketoneketone), and PEEK (polyetheretherketone). As used herein "low melt temperature thermoplastic" 54 is a thermoplastic that melts at temperatures below the melt temperature of the high melt temperature thermoplastic 46. Examples of low melt temperature thermoplastic polymers include, but are not limited to polyethylene and polypropylene.

When a preform 88 containing both high and low melt temperature thermoplastics is heated to the melt temperature of the low melt temperature thermoplastic, the low temperature thermoplastic melts, but the high temperature thermoplastic does not melt. In some examples, the low melt temperature thermoplastic 54 may have a melt temperature below approximately 300° C., however, in other examples, the low melt temperature thermoplastic may have a melt temperature that is above 300° C., providing the melt temperature of the high melt temperature thermoplastic is above that of the low melt temperature thermoplastic. For example, and without limitation, where the melt temperature of the high melt temperature thermoplastic is 340° C., the low melt temperature thermoplastic may have a melt temperature of 310° C. Thus, it may be possible to use a thermoplastic such as PEEK having a melt temperature of 343° C. to tack together plies of PEKK prepreg which has a melt temperature of about 360° C.

Continuing to refer to FIG. 3, the tape 38 has a width "W" which will depend upon application, and in some applications, may comprise slit tape, i.e. slices of a tape of a wider width. The composite tape 38 is drawn from a supply spool (not shown) on the placement head 36 and is fed to a compaction roller 44 which compacts the tape 38 onto the surface of an underlying ply 30 (or a tool) as the placement head 36 moves over the substrate 48. The placement head 36 is automatically rotated and displaced in order to steer the tape 38 onto the substrate 48 in any desired fiber orientation. As the placement head 36 moves over the substrate 48, a heat source 50 directs thermal energy 52 onto an area of an underlying ply 30 immediately ahead of the compaction roller 44.

The heat source 50 may comprise a device that generates thermal energy 52 at a relatively low level, such as, without limitation an infrared heater. However, higher energy sources of thermal energy, such as a laser or electron beam may be employed. The heat source 50 generates sufficient thermal energy 52 to melt the particles 62 of low melt temperature thermoplastic 54 present on the surface 34 of the tape 38. However, the applied thermal energy 52 is not great enough to melt the high melt temperature thermoplastic tape 38. In other words, the heat source 50 heats the surface 34 of the tape 38 to a temperature that is sufficient to melt the low melt temperature thermoplastic 54 without melting the high melt temperature thermoplastic 46 of the prepreg tape 38. As noted previously, principles of the disclosed embodiments are applicable to preforms 88 having composite plies 30 that are laid up using any of a variety of layup techniques.

Figure 4:
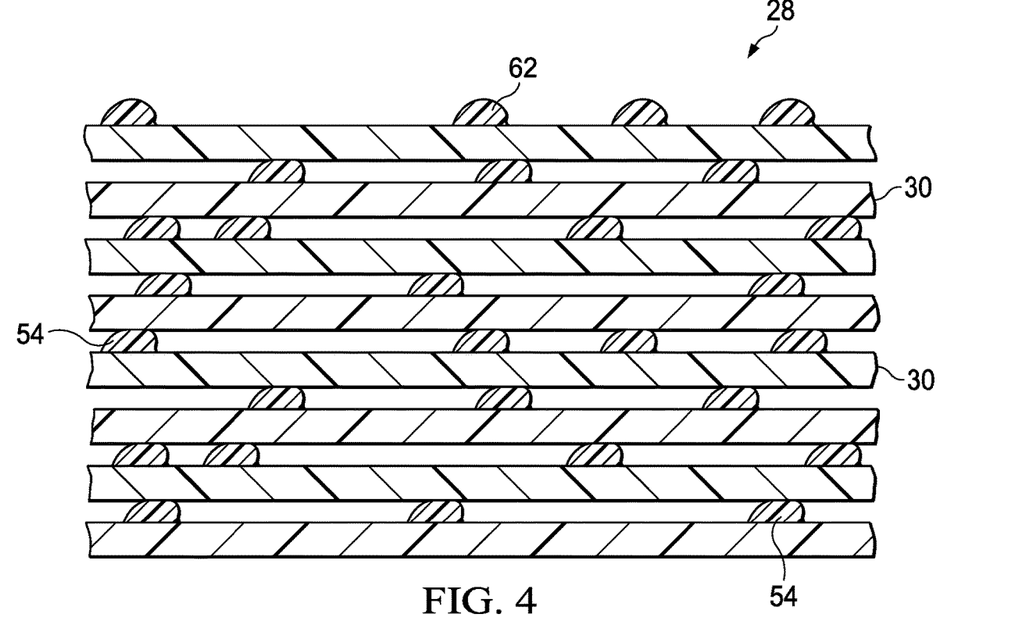
FIG. 4 is an illustration of a cross-sectional view taken along the line 4-4 in FIG. 3 wherein spacing between the plies is exaggerated to reveal low-temperature thermoplastic tacking.
Figure 5:
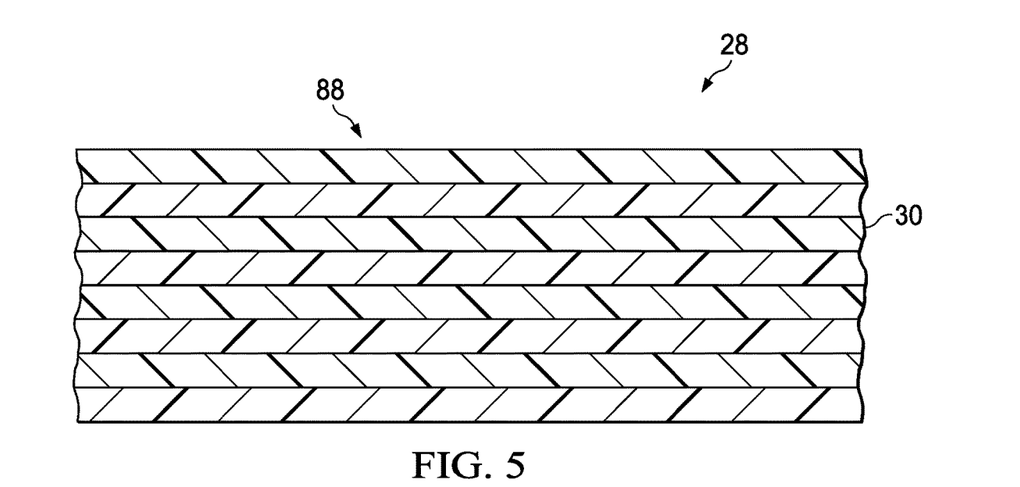
FIG. 5 is an illustration similar to FIG. 4 but showing the plies having been consolidated.

FIG. 4 is a cross-sectional view showing the particles 62 after they have been melted by the heat source 50 and subsequently cooled. As the melted particles 62 cool, they adhere and tack the plies 30 together, and prevent the plies 30 from shifting relative to each other within the stack 28. Consequently, registration of the plies 30 is maintained throughout the layup process, and thereafter when the preform 88 is transferred to either storage or to another processing station for shape forming and/or consolidation. FIG. 5 is a view similar to FIG. 4 but shows the plies 30 consolidated as a result of having been heated to the melt temperature of the high melt temperature thermoplastic 46, and compacted.

Figure 6:
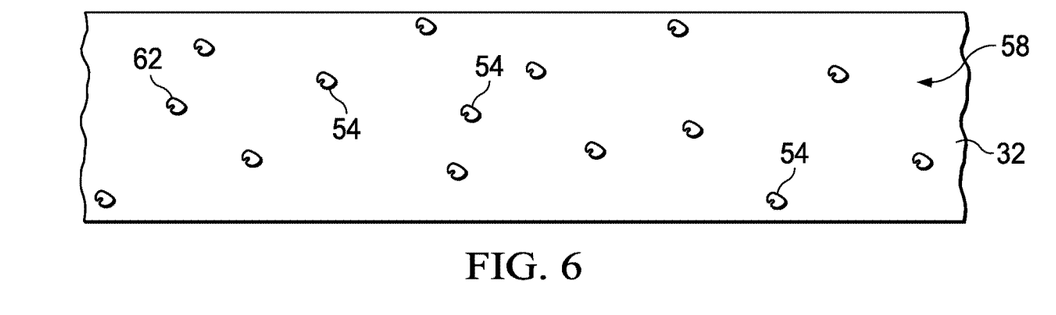
FIG. 6 is an illustration of a plan view of a section of high melt temperature thermoplastic prepreg tape having particles of low temperature thermoplastic having been applied to a surface thereof.
Figure 7:
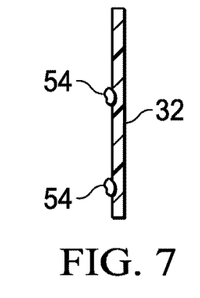
FIG. 7 is an illustration of an end view of the prepreg tape shown in FIG. 6.
Figure 8:
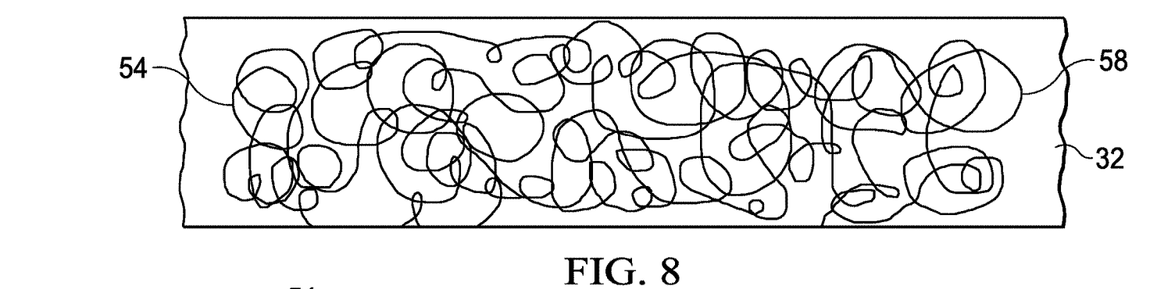
FIG. 8 is an illustration of a plan view of a section of prepreg tape on which molten low melt temperature thermoplastic has been applied in a continuous but random pattern.
Figure 9:
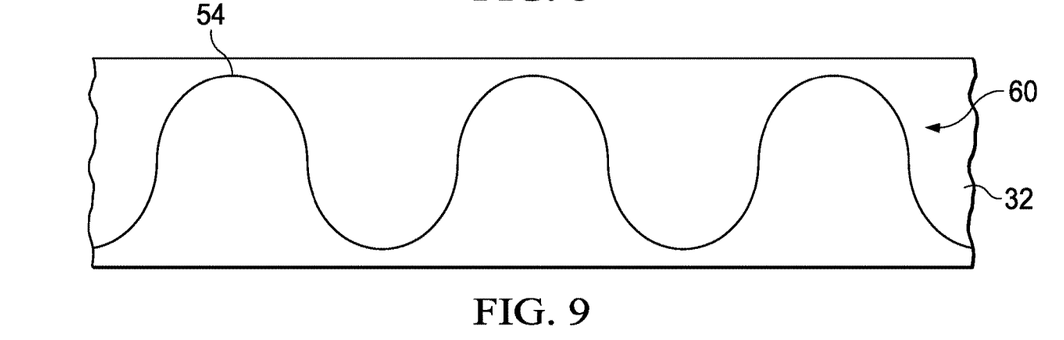
FIG. 9 is illustration similar to FIG. 8 but wherein the pattern is repeating.

Referring to FIGS. 6-9, the low melt temperature thermoplastic 54 can be applied to the surface 34 of the prepreg tape 38 in any of various ways. In FIGS. 6 and 7, low melt temperature thermoplastic 54 in the form of particles 62 is deposited in dry form, or alternatively liquefied low melt temperature thermoplastic 54 can be sprayed onto the surface 34 of the tape 38 either in a random pattern 58 (FIGS. 6-8) or a regular/repeating pattern 60 (FIG. 9). During cooling, the melted dry particles 62 solidify and adhere to the surface 34 of the tape 38. In another example shown in FIG. 8, the low melt temperature thermoplastic 54 is applied to the tape 38 by streaming molten low melt temperature thermoplastic 54 onto the surface 34 in a continuous but random pattern 58. In still another example shown FIG. 9, molten low melt temperature thermoplastic 54 can be applied to the tape 38 by streaming it onto the surface 34 continuously in a repeating pattern 60.

In still another example not shown in the Figures, the low melt temperature thermoplastic 54 can be applied to the tape 38 by spraying a liquefied low melt temperature thermoplastic onto the entire surface 34 of the tape 38. Other application patterns are possible, including for example and without limitation, applying the low melt temperature thermoplastic 54 in a pattern (not shown) having a shape that facilitates tack between the plies 30 and/or minimizes the amount low melt temperature thermoplastic 54 required to achieve a desired degree of tack between the plies 30. A variety of other techniques for applying the low melt temperature thermoplastic 54 are possible. In the example where the entire surface 34 of the tape 38 is covered with low melt temperature thermoplastic 54, thermal energy 52 can be directed onto the tape surface 34 such that all or only a portion of the low melt temperature thermoplastic 54 is melted. For example and without limitation, the low temperature melt thermoplastic 54 could be applied in a pattern, and then heated to its melt temperature, to achieve tacking only in specifically selected areas of the plies 30 in order to facilitate forming the preform to a particular shape. Further, the low melt temperature thermoplastic 54 could be applied in a pattern that facilitates creation of a preform 88 having a particular shape and/or which facilitates forming the preform 88 into a particular shape.

Figure 10:
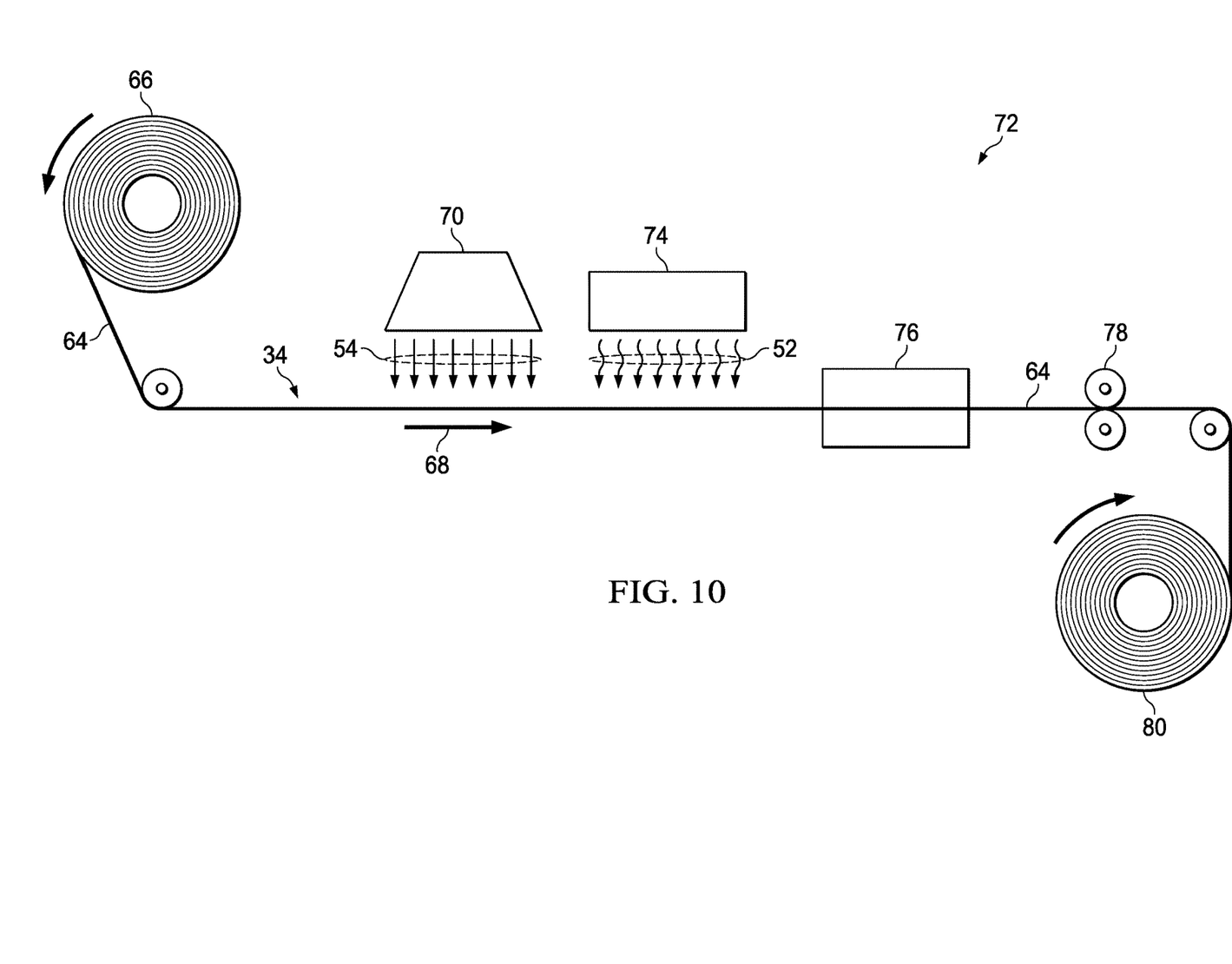
FIG. 10 is an illustration of a diagrammatic view of apparatus for applying a low-temperature thermoplastic polymer on the surface of a high temperature thermoplastic prepreg tape.

FIG. 10 diagrammatically illustrates a system 72 for producing the high melt temperature thermoplastic prepreg tape 38 having the low melt temperature thermoplastic 54 applied thereto as described previously. High melt temperature thermoplastic prepreg tape 64, which may comprise slit tape, is drawn from a supply spool 66 past an applicator 70 that applies the low melt temperature thermoplastic 54 on the surface 34 of the prepreg tape 64. As previously described, the applicator 70 may spray, stream or otherwise deposit the low melt temperature thermoplastic 54, either dry or in a liquefied state, onto the surface 34 of the prepreg tape 64. The applied low melt temperature thermoplastic 54 may comprise particles, or an intermittent or continuous molten stream of material that covers either a portion or the entire area of the surface 34 of the tape 38.

In some embodiments, the low melt temperature thermoplastic 54 applied by the applicator 70 may be in a molten form that adheres to the surface 34 of the tape 38 shortly after contact. In other examples, the low melt temperature thermoplastic 54 is heated to its melt temperature by a source 74 of thermal energy, such as, for example and without limitation, an infrared heater (not shown), following which the tape 38 passes through a cooler 76, thereby cooling the low melt temperature thermoplastic 54 such that it solidifies and adheres to the surface 34 of the tape 38. The finished prepreg tape then passes through one or more driven or passive rollers 78 before being drawn onto a take-up spool 80. The spool 80 may be used as a supply of the prepreg tape 38 that is carried on the tape placement head 36 (FIG. 3) which feeds the tape 38 to the compaction roller 44 that compacts the tape 38 onto the substrate 48.

Figure 11:
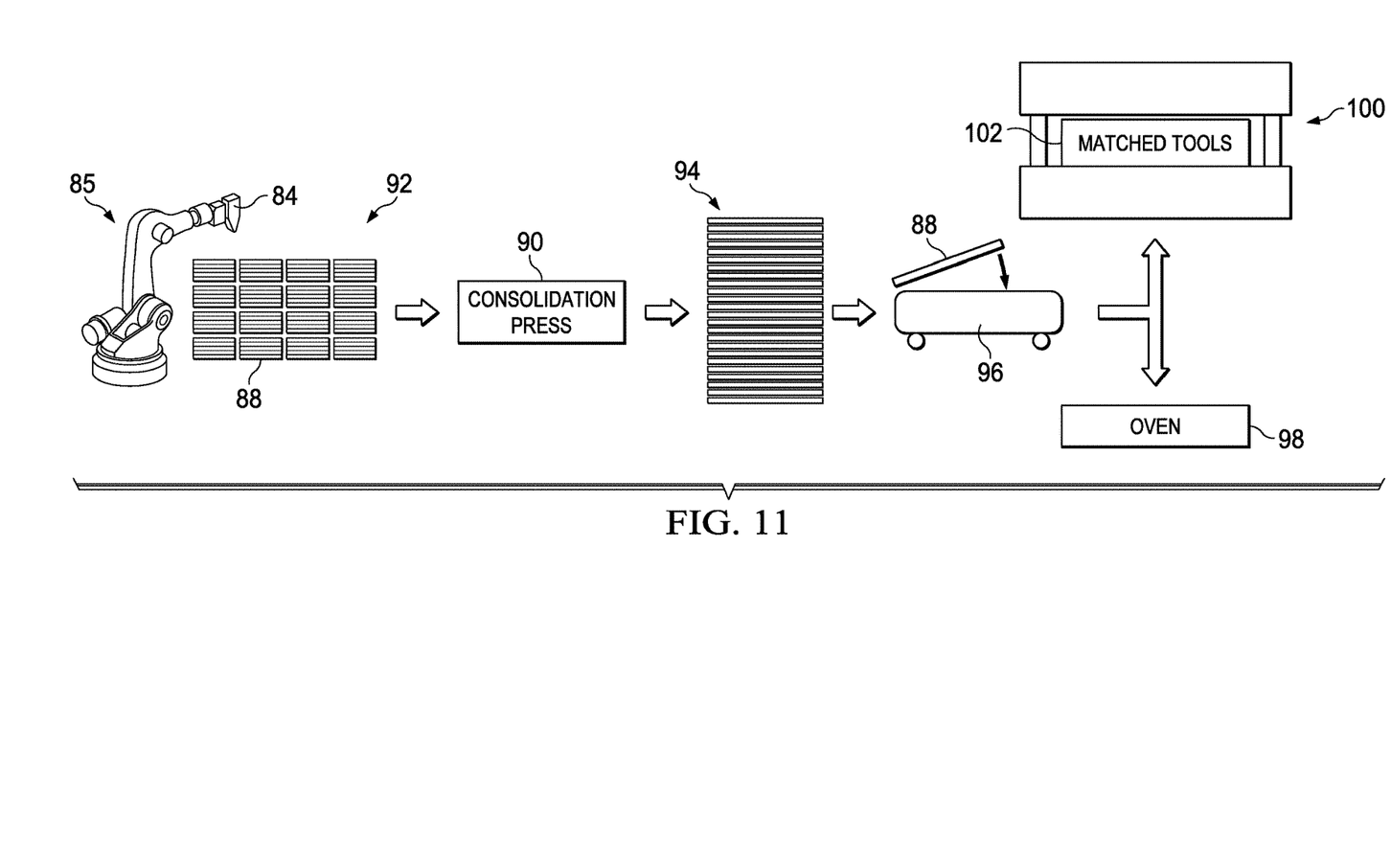
FIG. 11 is an illustration of a diagrammatic view of a method of making high temperature thermoplastic composite laminate parts using a preform produced in accordance to the disclosed embodiments.

FIG. 11 diagrammatically illustrates a production system for manufacturing thermoplastic composite parts using principles of the disclosed embodiments. The ATL equipment 82 may comprise an end effector 84 such as the previously described tape placement head 36, operated by a numerically controlled manipulator, which may comprise, without limitation, a robot 85. The robot 85 lays up a group 92 preforms 88, each comprising a plurality of high melt temperature thermoplastic prepreg plies 30 that are tacked together by a low melt temperature thermoplastic 54, as previously discussed. The preforms 88 are consolidated either individually, or as a group in a suitable consolidation press 90, and thereafter maybe accumulated as a stack 94. The preforms 88 may be individually drawn from the stack 94 and transferred by a shuttle 96 or means to an oven 98 where they are heated to at least the melt temperature of the high temperature thermoplastic prepreg 46. Each of the heated preforms 88 is then placed in a forming machine such as, without limitation, a stamping press 100 where it is formed to the desired part shape between a pair of matched tools 102. Other forming techniques are possible, including but not limited to vacuum bag compaction, autoclave processing and drape forming.

Figure 12:
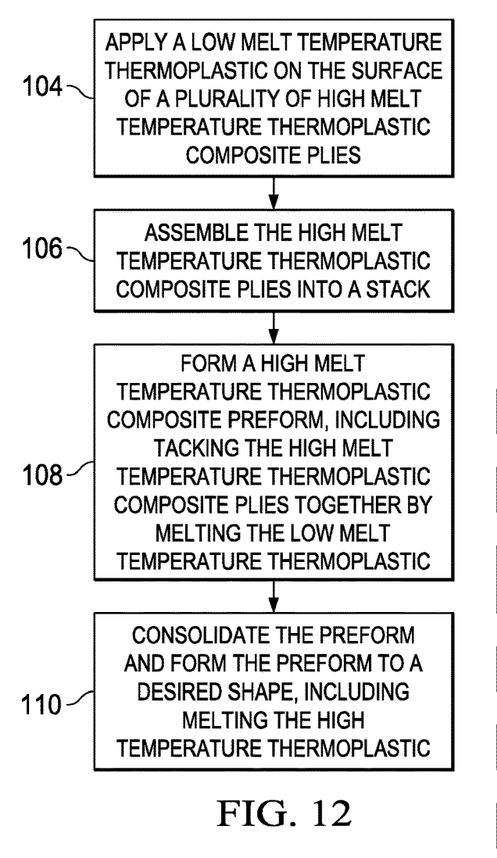
FIG. 12 is an illustration of a flow diagram of a method of making high temperature thermoplastic composite laminate parts.

Attention is now directed to FIG. 12 which broadly illustrates the steps of a method of making a composite structure 20 in accordance with the disclosed embodiments. Beginning at 104, a low melt temperature thermoplastic 54 is applied on the surface 34 of a plurality of high melt temperature thermoplastic composite plies 30. At 106, the high melt temperature thermoplastic composite plies 30 are assembled into a stack 94. The stack 94 may be assembled by laying up the plies 30 using automated or hand layup techniques, as previously described. At 108, a high melt temperature thermoplastic composite preform 88 is formed, including tacking the high melt temperature thermoplastic composite plies 30 together by melting the low melt temperature thermoplastic 54, as by heating the low melt temperature thermoplastic to its melt temperature. The low melt temperature thermoplastic 54 may be introduced between the plies 30 by applying the low melt temperature thermoplastic 54 in liquefied or dry form to the surface 34 of the plies 30. At 110, the preform 88 is consolidated and formed to a desired shape, including heating the preform and melting the high melt temperature thermoplastic composite plies 30.

Figure 13:
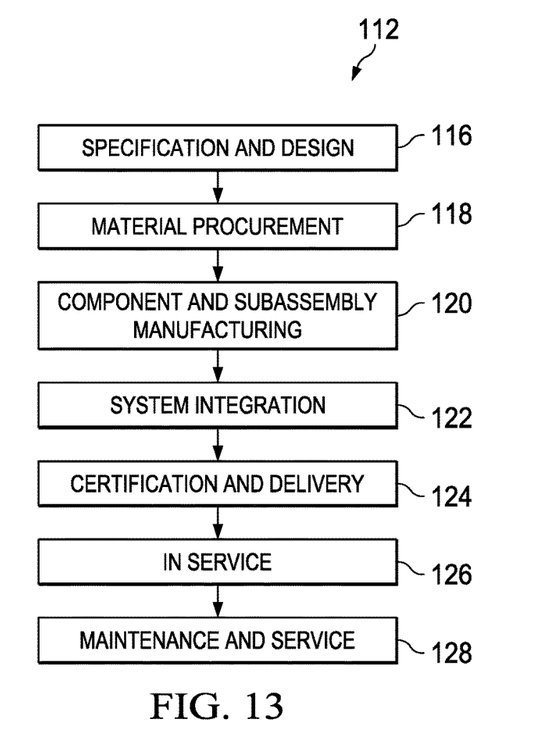
FIG. 13 is an illustration of a flow diagram of aircraft production and service methodology.
Figure 14:
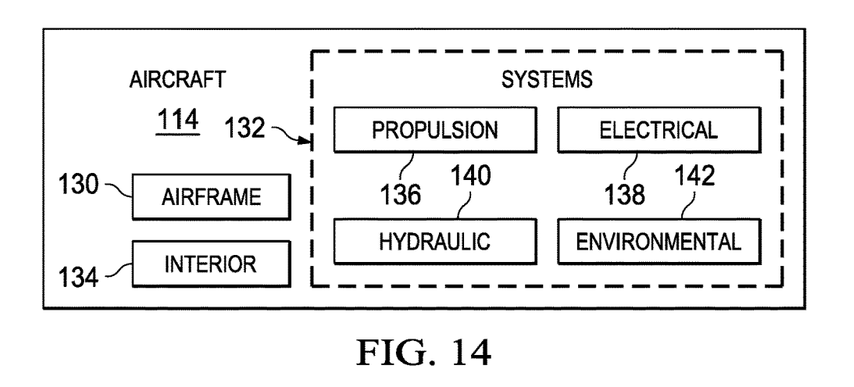
FIG. 14 is an illustration of a block diagram of an aircraft.

Embodiments of the disclosure may find use in a variety of potential applications, particularly in the transportation industry, including for example, aerospace, marine, automotive applications and other application where thermoplastic composite parts are used. Thus, referring now to FIGS. 13 and 14, embodiments of the disclosure may be used in the context of an aircraft manufacturing and service method 112 as shown in FIG. 13 and an aircraft 114 as shown in FIG. 14. Aircraft applications of the disclosed embodiments may include, for example, without limitation, structural stiffeners used in the airframe 137 of the aircraft 114. During pre-production, exemplary method 112 may include specification and design 116 of the aircraft 114 and material procurement 118. During production, component and subassembly manufacturing 120 and system integration 122 of the aircraft 114 takes place. Thereafter, the aircraft 114 may go through certification and delivery 124 in order to be placed in service 126. While in service by a customer, the aircraft 114 is scheduled for routine maintenance and service 128, which may also include modification, reconfiguration, refurbishment, and so on.

Each of the processes of method 112 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on. High temperature thermoplastic composite parts and structures according to the disclosed embodiments may be employed as part of material procurement 118, component and subassembly manufacturing 120, airframe 130 and the interior 134 of the aircraft 114.

As shown in FIG. 14, the aircraft 114 produced by exemplary method 112 may include an airframe 130 with a plurality of systems 132 and an interior 134. Examples of high-level systems 132 include one or more of a propulsion system 136, an electrical system 138, a hydraulic system 140, and an environmental system 142. Any number of other systems may be included. Although an aerospace example is shown, the principles of the disclosure may be applied to other industries, such as the marine and automotive industries.

Systems and methods embodied herein may be employed during any one or more of the stages of the production and service method 112. For example, components or subassemblies corresponding to production process 120 may be fabricated or manufactured in a manner similar to components or subassemblies produced while the aircraft 114 is in service. Also, one or more apparatus embodiments, method embodiments, or a combination thereof may be utilized during the production stages 120 and 122, for example, by substantially expediting assembly of or reducing the cost of an aircraft 114. Similarly, one or more of apparatus embodiments, method embodiments, or a combination thereof may be utilized while the aircraft 114 is in service, for example and without limitation, to maintenance and service 128.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of making a thermoplastic composite preform, comprising:
   depositing particles of a low melt temperature thermoplastic onto only a portion of a surface of a prepreg tape comprising a high melt temperature thermoplastic resin, at a temperature below a melt temperature of the high melt temperature thermoplastic resin, the portion being a pattern tacking high melt temperature thermoplastic composite plies to maintain a registration of the prepreg tape within a preform comprising high melt temperature thermoplastic composite plies;
   assembling the preform comprising tacking a first strip of the prepreg tape together with a second strip of the prepreg tape on a surface of the preform by melting a portion of the particles of the low melt temperature thermoplastic on a surface of the first strip immediately ahead of a compaction roller compressing the first strip onto the second strip; and
   shearing the high melt temperature thermoplastic composite plies relative to each other and forming the high melt temperature thermoplastic composite plies into a desired shape for the thermoplastic composite preform.

2. The method of claim 1, further comprising:
   applying the low melt temperature thermoplastic to a portion of a surface, respectively, of each ply forming the thermoplastic composite preform; and
   heating the low melt temperature thermoplastic on the surface of each of the high melt temperature thermoplastic composite plies to a melt temperature of the low melt temperature thermoplastic.

3. The method of claim 1, further comprising applying the low melt temperature thermoplastic on a surface of each of the high melt temperature thermoplastic composite plies.

4. The method of claim 1, further comprising depositing the low melt temperature thermoplastic in a pattern facilitating forming the preform into a particular shape.

5. The method of claim 1, further comprising the melt temperature of the prepreg tape comprising the high melt temperature thermoplastic resin being above approximately 300° C.

6. The method of claim 5, further comprising, heating the low melt temperature thermoplastic beneath the prepreg tape while laying down the prepreg tape.

7. The method of claim 1, further comprising, applying the low melt temperature thermoplastic on a surface of the high melt temperature thermoplastic composite plies in a continuous pattern.

8. The method of claim 1, further comprising, applying the particles of low melt temperature thermoplastic on a surface of the high melt temperature thermoplastic composite plies in a random pattern facilitating forming the high melt temperature thermoplastic composite plies into the desired shape for the thermoplastic composite preform.

9. The method of claim 1, further comprising, at least one of:
depositing dry particles comprising the low melt temperature thermoplastic onto the portion of a surface of the high melt temperature thermoplastic composite plies in a random pattern.

10. A method of making a thermoplastic composite structure, the method comprising:
adhering, at a temperature below a melt temperature of a high melt temperature thermoplastic resin, particles of a low melt temperature thermoplastic to only a portion of a prepreg tape, comprising the high melt temperature thermoplastic resin, drawing onto a take-up spool, the portion being a pattern tacking the prepreg tape into a composite preform comprising fiber reinforced high melt temperature thermoplastic plies to maintain a registration of the prepreg tape within the composite preform;
laying up the prepreg tape and producing the composite preform comprising fiber reinforced thermoplastic plies via tacking the fiber reinforced high melt temperature thermoplastic plies together by melting portions of the low melt temperature thermoplastic on a surface of the composite preform just prior to laying and compressing the prepreg tape onto the composite preform; and
shearing the fiber reinforced high melt temperature thermoplastic plies relative to each other and consolidating the composite preform.

11. The method of claim 10, wherein:
producing the composite preform includes spraying the low melt temperature thermoplastic onto a surface of the prepreg tape.

12. The method of claim 10, further comprising randomly depositing the particles of the low melt temperature thermoplastic on the surface of the prepreg tape.

13. The method of claim 11, further comprising melting and cooling the low melt temperature thermoplastic on the surface of the prepreg tape before drawing the prepreg tape onto the take-up spool.

14. The method of claim 10, further comprising melting the low melt temperature thermoplastic during the laying up of the fiber reinforced thermoplastic plies.

15. The method of claim 10, wherein the consolidating includes:
melting the high melt temperature thermoplastic resin by heating the composite preform; and
compacting the composite preform.

16. The method of claim 15, further comprising:
forming the composite preform to a desired shape, wherein heating the composite preform melts the low melt temperature thermoplastic for slipping the fiber reinforced thermoplastic plies relative to each other during the forming.

17. The method of claim 10, wherein producing the composite preform includes:
laying up the fiber reinforced thermoplastic plies by laying down strips comprising a thermoplastic prepreg using an automatic tape laying machine, and
while laying down the strips, melting the low melt temperature thermoplastic by directing thermal energy onto a surface of the strips.

18. A method of making a composite material for use in fabricating a composite structure, comprising:
providing a strip comprising a high melt temperature thermoplastic prepreg; and
applying, at a temperature below a melt temperature of the high melt temperature thermoplastic prepreg, particles of a low melt temperature thermoplastic on a surface of only a portion of the strip in a pattern tacking the strip into a composite high melt temperature thermoplastic preform to maintain the strip in registration within the composite high melt temperature thermoplastic preform;
tacking a second high melt temperature thermoplastic prepreg onto the low melt temperature thermoplastic; and
shearing the high melt temperature thermoplastic prepreg and the second high melt temperature thermoplastic prepreg relative to each other and forming the high melt temperature thermoplastic prepreg and the second high melt temperature thermoplastic prepreg into a desired shape for the composite structure.

19. The method of claim 18, further comprising spraying the low melt temperature thermoplastic onto the surface of the strip.

20. The method of claim 18, further comprising:
adhering the low melt temperature thermoplastic on the surface of the strip by heating the low melt temperature thermoplastic to its melt temperature.

21. The method of claim 20, further comprising:
solidifying the low melt temperature thermoplastic by cooling the low melt temperature thermoplastic, and
reeling the high melt temperature thermoplastic prepreg onto a spool.

22. A method of making a thermoplastic composite preform, comprising:
assembling a stack of high melt temperature thermoplastic composite plies;
applying particles of a low melt temperature thermoplastic only to a portion of a surface of a high melt temperature composite plie between layers in the stack of high melt temperature thermoplastic composite plies at a temperature below a melt temperature of the stack of high melt temperature thermoplastic composite plies;
subsequently, tacking the stack of high melt temperature thermoplastic composite plies together by melting the low melt temperature thermoplastic; and
shearing the stack of high melt temperature thermoplastic composite plies relative to each other while forming the thermoplastic composite preform.

23. The method of claim 22, wherein at least one portion consists of a random application pattern that minimizes an amount of the low melt temperature thermoplastic required to achieve a desired degree of tack between the layers.

* * * * *